United States Patent
Abe (10) Patent No.: US 11,372,513 B2
(45) Date of Patent: Jun. 28, 2022

(54) DISPLAY APPARATUS, CONTROL METHOD THEREOF AND STORAGE MEDIUM FOR DISPLAYING A BACKGROUND IMAGE AROUND EACH OF A PLURALITY OF IMAGES

(71) Applicant: CANON KABUSHIKI KAISHA, Tokyo (JP)

(72) Inventor: Takahiro Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/729,707

(22) Filed: Dec. 30, 2019

(65) Prior Publication Data

US 2020/0228716 A1 Jul. 16, 2020

(30) Foreign Application Priority Data

Jan. 15, 2019 (JP) .............................. JP2019-004619

(51) Int. Cl.
*G06F 3/048* (2013.01)
*G09G 3/34* (2006.01)

(52) U.S. Cl.
CPC .......... *G06F 3/048* (2013.01); *G09G 3/3413* (2013.01); *G06F 2203/04803* (2013.01); *G09G 2320/0233* (2013.01); *G09G 2360/16* (2013.01)

(58) Field of Classification Search
CPC .......... G06F 2203/04803; G06F 3/048; G09G 2320/0233; G09G 2320/0613; G09G 2320/062; G09G 2320/0686; G09G 3/3413; H04N 1/00442–00458
See application file for complete search history.

(56) References Cited

U.S. PATENT DOCUMENTS

| | | | |
|---|---|---|---|
| 6,573,928 B1* | 6/2003 | Jones | H04N 13/349 348/51 |
| 9,236,027 B2* | 1/2016 | Ishida | G09G 3/20 |
| 2001/0026644 A1* | 10/2001 | Endo et al. | |
| 2010/0054584 A1* | 3/2010 | Schadt et al. | G06T 7/90 |
| 2011/0050723 A1* | 3/2011 | Tokunaga | G06T 11/00 345/627 |
| 2014/0108909 A1* | 4/2014 | Geelnard | G06F 16/9574 715/234 |
| 2014/0229875 A1* | 8/2014 | Li | G09G 5/10 715/771 |
| 2019/0005016 A1* | 1/2019 | Hamlin | G06F 40/186 |
| 2020/0064978 A1* | 2/2020 | Nishikawa | G06F 3/0485 |

FOREIGN PATENT DOCUMENTS

JP 6141345 B 6/2017

* cited by examiner

*Primary Examiner* — Gene W Lee
(74) *Attorney, Agent, or Firm* — Venable LLP (57) ABSTRACT

A display apparatus includes a display device capable of changing at least one of a plurality of parameters including a luminescence intensity, a color gamut, and an electro optical transfer function (EOTF); and at least one processor or circuit configured to function as a display control unit configured to control the display device to display a plurality of images and a background image displayed around each of the plurality of images such that an appearance of the background image is visually identical between the plurality of images when the display device is caused to display the plurality of images.

6 Claims, 12 Drawing Sheets

DISPLAY APPARATUS, CONTROL METHOD THEREOF AND STORAGE MEDIUM FOR DISPLAYING A BACKGROUND IMAGE AROUND EACH OF A PLURALITY OF IMAGES

BACKGROUND OF THE INVENTION

Field of the Invention

The present invention relates to a technique for processing a background color in a display apparatus.

Description of the Related Art

Images captured by a digital camera or the like are viewed using a display device such as a display panel of a digital camera or a display of a personal computer. In the case where multiple images are compared on one display apparatus, the images are compared by a method of comparing the images by switching a displayed image in a setting in which a single image is displayed on the display apparatus, or a method of comparing the images by simultaneously displaying a plurality of images on the display apparatus. Hereinafter, the method in which a single image is displayed on the display apparatus is referred to as a single display, and the method in which a plurality of images are displayed on the display apparatus is referred to as a split display.

When the image size of the displayed image and the resolution (dot number) of a display unit of the display apparatus differ from each other, the image is displayed by resizing the image. In addition, when the aspect ratio of the resolution of the display unit of the display apparatus and the aspect ratio of the displayed image differ from each other, the image is displayed by padding the image.

Figure 12A:
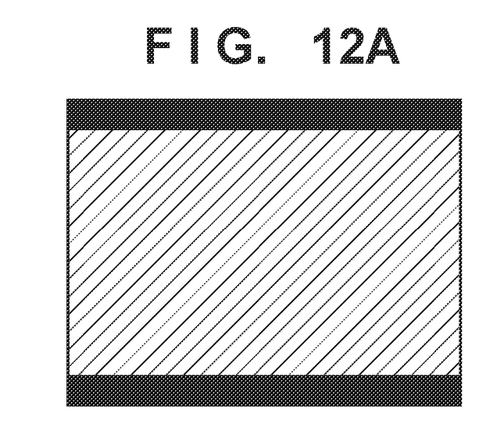
FIGS. 12A to 12D illustrate exemplary background padding.
Figure 12B:
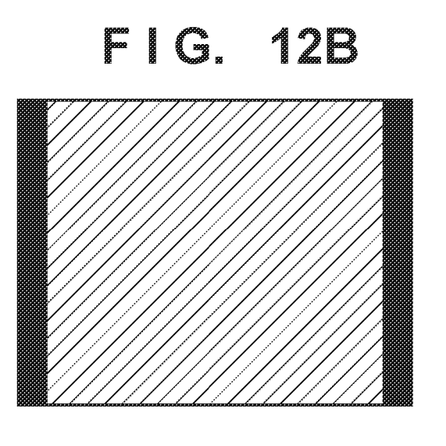
Figure 12C:
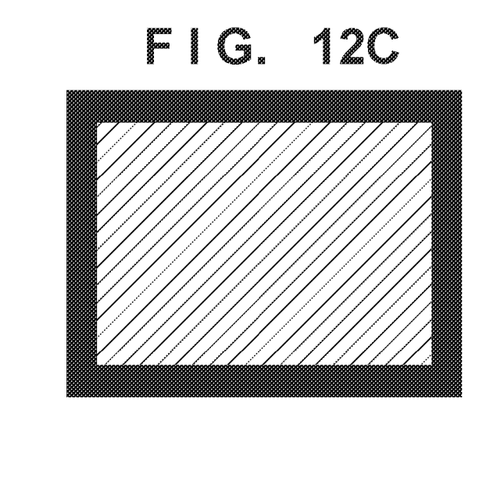
Figure 12D:
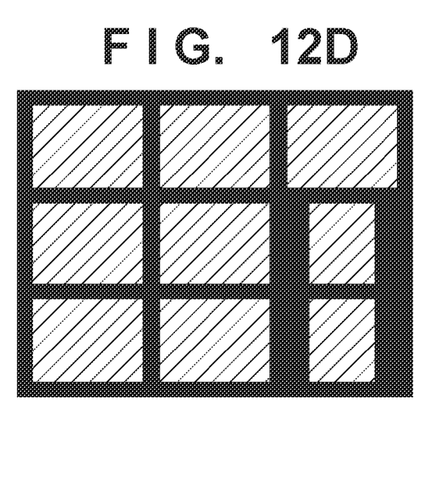

FIGS. 12A to 12C illustrate padding in the case of a single display and FIG. 12D illustrates padding in the case of a split display. A resized image is illustrated with diagonal hatching, and a padding region is illustrated with solid black. FIG. 12A is called a letterbox, FIG. 12B is called a pillar box or a side panel, and FIG. 12C is called a window box. Hereinafter, the padding region as illustrated in FIGS. 12A to 12D is referred to as the background, and the color of the background is referred to as the background color.

In recent years, liquid crystal display and Organic Light Emitting Diode (OLED) products capable of displaying images by splitting one screen into a plurality of regions and controlling the color gamut, display luminance, and Electro Optical Transfer Function (EOTF) for each split region have become widespread.

Japanese Patent No. 6141345 discloses a method in which, when one screen of a liquid crystal display is split into a plurality of regions and the color gamut and/or the display luminance is set for each split region, the image of each split region is displayed with high image quality by controlling the luminous intensity of the backlight.

In the method disclosed in Japanese Patent No. 6141345, however, the background color is not considered. Consequently, in the case where the background color is uniformly set to the same value so that the background color has the same appearance, the appearance of the background color may vary due to differences in the luminescence intensity of the backlight, despite the background color being desired to have the appearance of the same brightness and the same color. In the comparison display of the images, it is desirable that the appearance of the background be the same so that the appearance of the background does not affect the comparison between the images of the effective image regions.

SUMMARY OF THE INVENTION

In view of the above-described problems, the present invention displays comparison images such that the background has the same appearance as much as possible.

According to a first aspect of the present invention, there is provided a display apparatus comprising: a display device capable of changing at least one of a plurality of parameters including a luminescence intensity, a color gamut, and an electro optical transfer function (EOTF); and at least one processor or circuit configured to function as a display control unit configured to control the display device to display a plurality of images and a background image displayed around each of the plurality of images such that an appearance of the background image is visually identical between the plurality of images when the display device is caused to display the plurality of images.

According to a second aspect of the present invention, there is provided a method of controlling a display apparatus including a display device capable of changing at least one of a plurality of parameters including a luminescence intensity, a color gamut, and an electro optical transfer function (EOTF), the method comprising: controlling the display device to display a plurality of images and a background image displayed around each of the plurality of images such that an appearance of the background image is visually identical between the plurality of images when the display device is caused to display the plurality of images.

DESCRIPTION OF THE EMBODIMENTS

An embodiment of the present invention is described below with reference to the accompanying drawings.

Device Configuration

Figure 1:
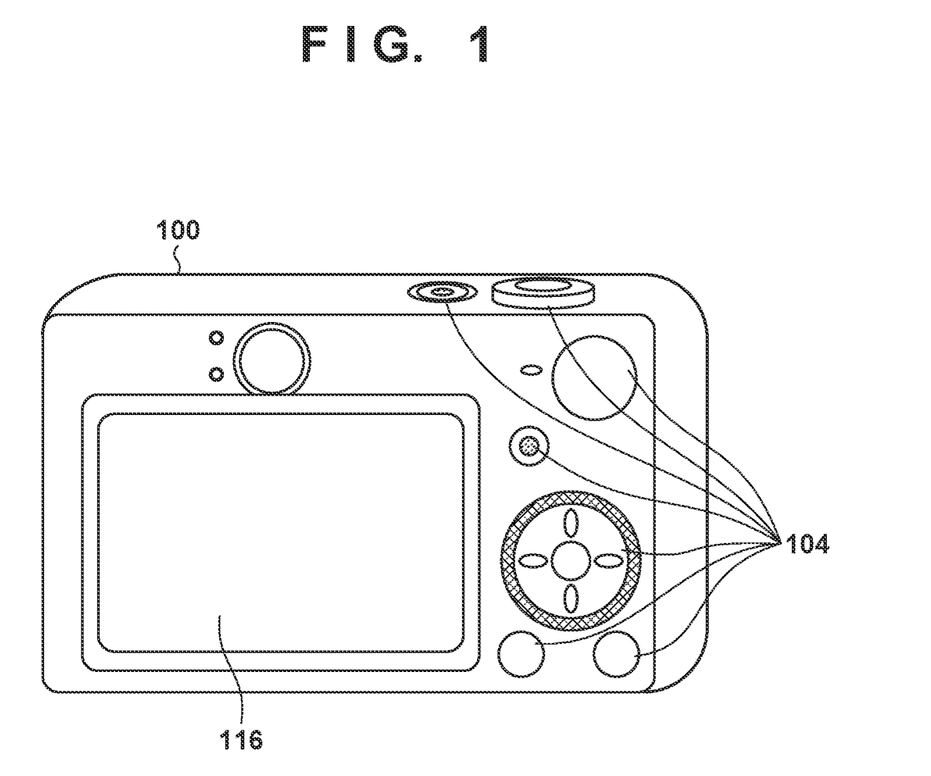
FIG. 1 is a diagram illustrating a configuration of a digital camera, which is one embodiment of a display apparatus of the present invention.

FIG. 1 is a diagram illustrating a configuration of a digital camera 100, which is an embodiment of a display apparatus of the present invention. In FIG. 1, a display unit 116 displays images and various types of information. The display unit 116 includes a touch panel, and serves also as an operation unit for receiving an operation from the user. An operation unit 104 is formed of operation members such as various types of switches, buttons, shutter buttons, mode switching buttons, and controller wheels for receiving various operations from the user. The power can be switched on and off with a power switch, and an image-capturing instruction can be made by operating the shutter button.

Entire Block Diagram

Figure 2:
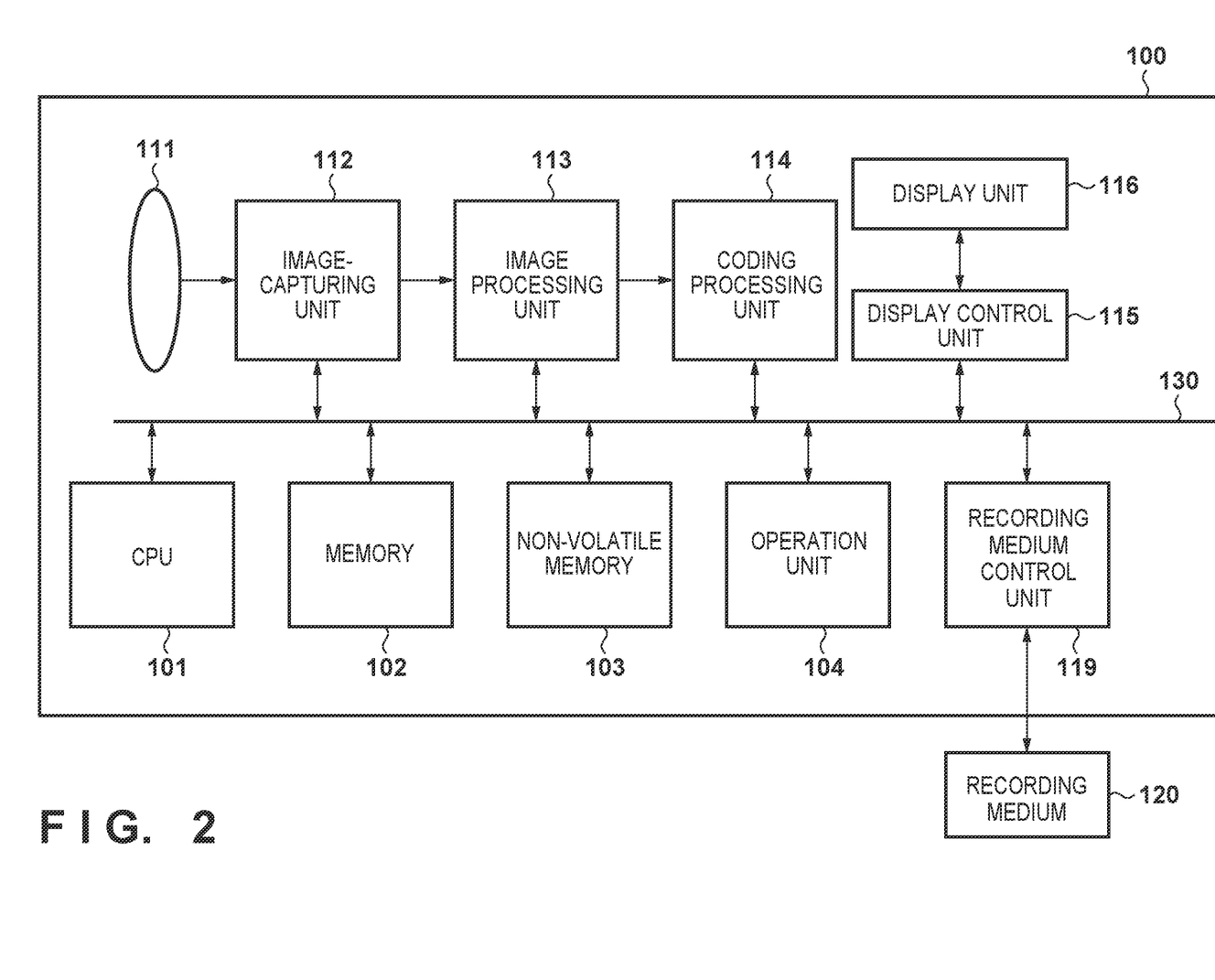
FIG. 2 is a diagram illustrating a block configuration of a digital camera according to one embodiment.

FIG. 2 is a diagram illustrating a block configuration of the digital camera 100. As illustrated in FIG. 2, the digital camera 100 includes a CPU 101, a memory 102, a non-volatile memory 103, an operation unit 104, an image capturing lens 111, an image-capturing unit 112, an image processing unit 113, and a coding processing unit 114. The digital camera 100 further includes a display control unit 115, a display unit 116, a recording medium control unit 119, a recording medium 120, and an internal bus 130.

The CPU 101 controls operations of the parts of the digital camera 100 by executing computer programs stored in the non-volatile memory 103.

The memory 102 is a rewritable volatile memory, and temporarily records computer programs for controlling the operations of the parts of the digital camera 100, information such as parameters related to the operations of the parts, and the like. The memory 102 has a sufficient storage capacity for temporarily recording information and/or images processed by the image-capturing unit 112, the image processing unit 113, the coding processing unit 114, and the like.

The non-volatile memory 103 is an electrically erasable and recordable memory, and is an EEPROM or the like. The non-volatile memory 103 stores computer programs for controlling the operations of the parts of the digital camera 100 and information such as parameters related to the operations of the parts, and the like. Here, the computer program is a program for executing various flowcharts described later in the present embodiment.

The operation unit 104 provides a user interface for operating the digital camera 100. The operation unit 104 includes a power button, a menu button, a shutter button, and the like of the digital camera 100, and each button is constituted by a switch, a multi-controller, a touch panel, or the like. The CPU 101 controls the digital camera 100 in accordance with user instructions input from the operation unit 104. Details of various operations at the operation unit 104 are described later with reference to FIGS. 3 to 7.

The image capturing lens 111 is configured by a lens group including a zoom lens and a focus lens, a lens control unit, a diaphragm, and the like. The image capturing lens 111 includes the lens control unit not illustrated, and controls the focal point adjustment and the focal ratio (f-number) by means of a control signal transmitted from the CPU 101.

The image-capturing unit 112 includes an image-capturing element configured to convert an optical image of a subject into an electrical signal. The image-capturing element is, for example, an area image sensor configured by an element such as a charge coupling device (CCD) and a complementary metal oxide semiconductor (CMOS). The image-capturing unit 112 outputs the captured image to the image processing unit 113 or the memory 102.

On the data output from the image-capturing unit 112 or data read from the memory 102, the image processing unit 113 performs a resizing process such as a predetermined pixel interpolation process and reduction process, provision of an image for matching the aspect ratio, a color conversion process, and the like. The image processing unit 113 supports a plurality of EOTFs such as γ, Perceptual Quantization (PQ), Hybrid Log Gamma (HLG), and the like.

In the image processing unit 113, a predetermined calculation process is performed using the captured image data, and the CPU 101 performs an exposure control and a distance-measuring control on the basis of the obtained calculation results. Thus, an auto exposure (AE) process, an auto white balance (AWB) process, and an autofocus (AF) process are performed.

The coding processing unit 114 compresses the data size by performing intra-screen prediction coding and inter-screen prediction coding on the input image data.

The display control unit 115 is a control unit for controlling the luminescence intensity, color gamut, EOTF, and the like of the display unit 116 in a changeable manner. When the display unit 116 provides a split display, the luminescence intensity, color gamut, EOTF, and the like of the display unit 116 are controlled for each split region.

The display unit 116 is configured by a liquid crystal display, an organic EL, or the like, and displays image signals sent from the display control unit 115. The display unit 116 can provide a split display, and the luminescence intensity, color gamut, EOTF, and the like can be set for each split region. The display unit 116 includes a touch panel, and serves also as an operation unit for receiving an operation from the user.

The recording medium 120 is a removable or built-in non-volatile memory, magnetic disk, or the like for recording captured and coded image data. The internal bus 130 is an internal bus for allowing each processing unit to access the CPU 101 and the memory 102.

Details of Operations of Operation Unit 104

Figure 3:
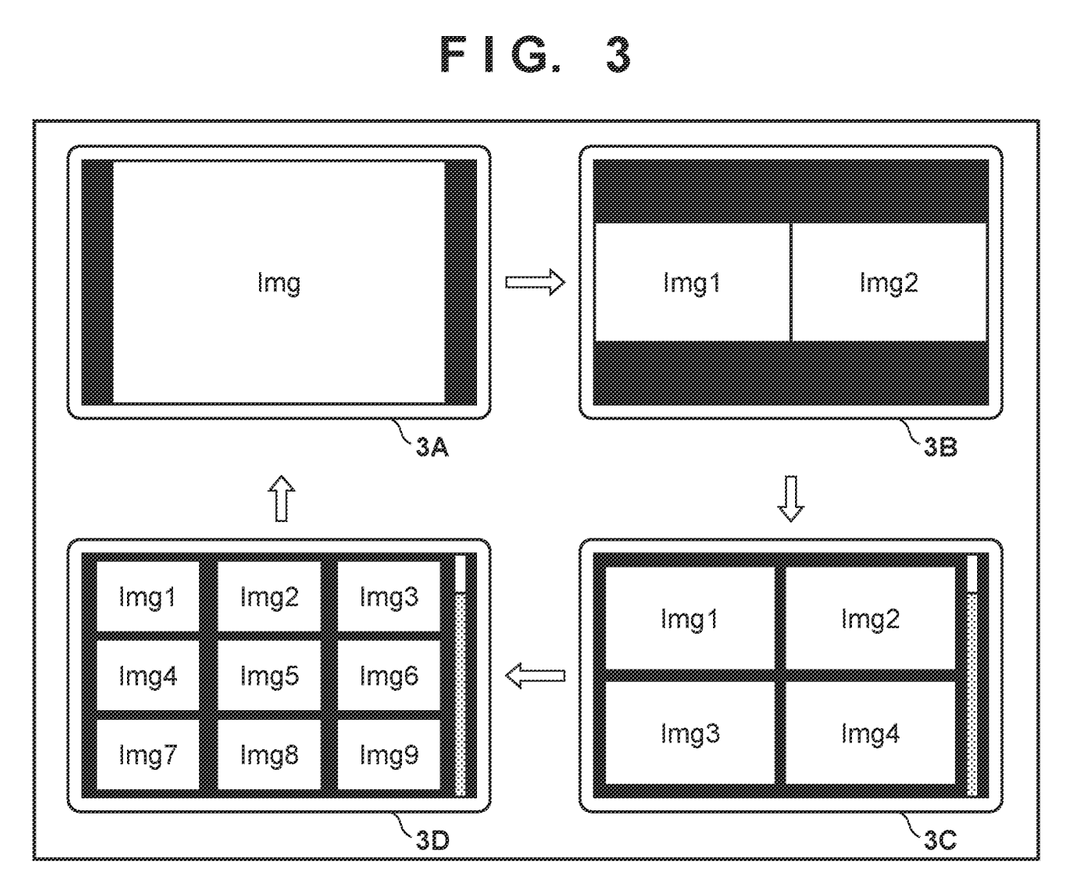
FIG. 3 is a diagram illustrating display modes according to one embodiment.

FIG. 3 is a diagram illustrating display modes according to the present embodiment. A numeral 3A in FIG. 3 denotes a single display. A numeral 3B in FIG. 3 denotes a left-right split display. A numeral 3C in FIG. 3 denotes a four-split display. A numeral 3D in FIG. 3 denotes a nine-split display.

Each time a display mode setting button is pressed from the operation unit 104, the display mode is switched in the order of the single display, the left-right split display, the four-split display, and the nine-split display. When the display mode setting button is pressed in the state of the nine-split display, the display is switched to the single display. Thus, the setting of the display mode can be switched in a ring-shaped loop. Note that the padding region around the image in FIG. 3 is referred to as the background color (background image).

FIGS. 4A to 4D are diagrams illustrating selection and switching of images of a left-right split display according to the present embodiment. The diagonal hatching indicates a state where the image is selected.

Figure 4A:
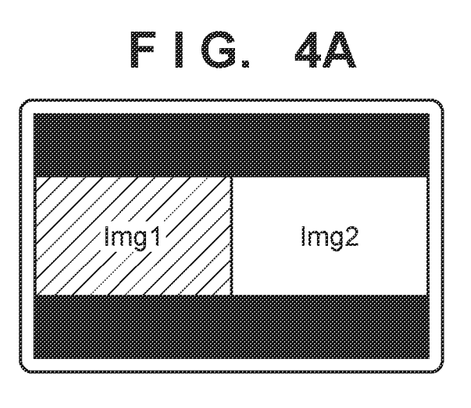
FIGS. 4A to 4D are diagrams illustrating selection and switching of images of a left-right split display.
Figure 4B:
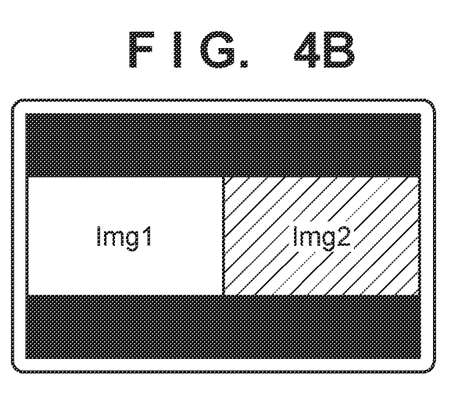

FIG. 4A illustrates a state where the left image region is selected, and FIG. 4B illustrates a state where the right image region is selected. The selected region is switched by means of left and right buttons of the multi-controller of the operation unit 104. When an image switching operation of the operation unit 104 is executed, the displayed image is switched. In the left-right split display, the displayed images are sequentially switched by operating the up and down buttons of the multi-controller of the operation unit 104.

Figure 4C:
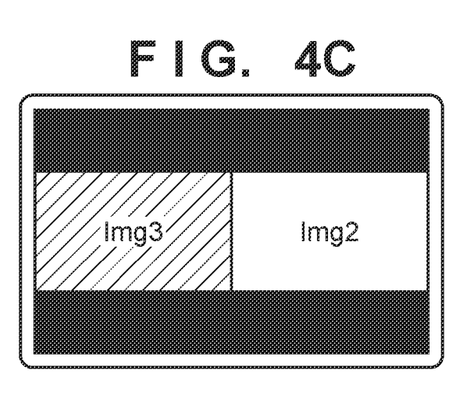
Figure 4D:
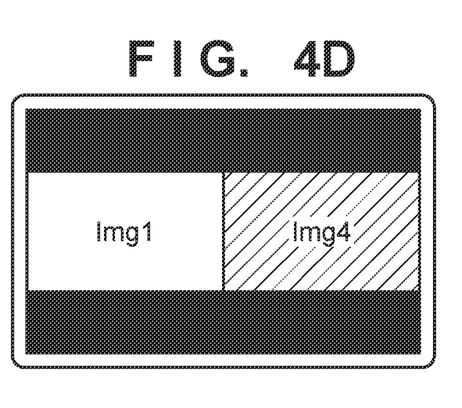

When the image switching operation is performed in the state where the left image region is selected as illustrated in FIG. 4A, the image of the left image region is switched as illustrated in FIG. 4C. When the image switching operation is performed in the state where the right image region is selected as illustrated in FIG. 4B, the image of the right image region is switched as illustrated in FIG. 4D.

FIGS. 5A to 5F are diagrams illustrating switching of images in the four-split display according to the present embodiment. The diagonal hatching indicates a state where the image is selected. In the four-split display, the selected image is switched by operating up, down, left and right buttons of the multi-controller of the operation unit 104. The selected image is switched in the up-down direction by means of the up and down buttons of the multi-controller. The selected image is switched in a Z-scan direction by means of the left and right buttons of the multi-controller. Here, the Z scan is a way of switching the selected image as illustrated in FIGS. 5A, 5B, 5C and 5D.

Figure 5A:
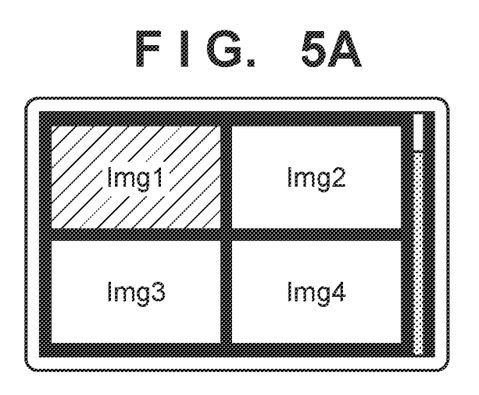
FIGS. 5A to 5F are diagrams illustrating switching of images of a four-split display.
Figure 5B:
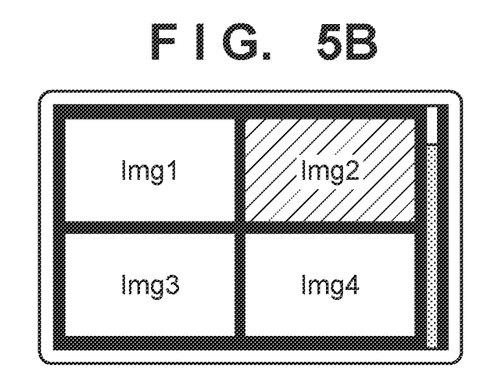
Figure 5C:
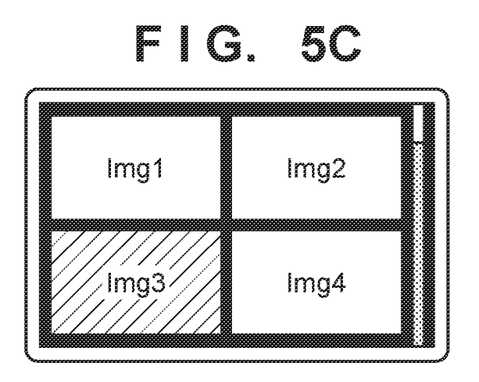
Figure 5D:
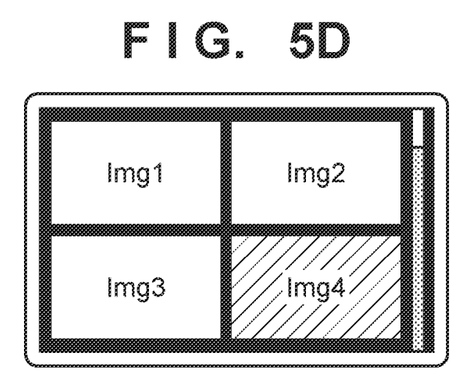
Figure 5E:
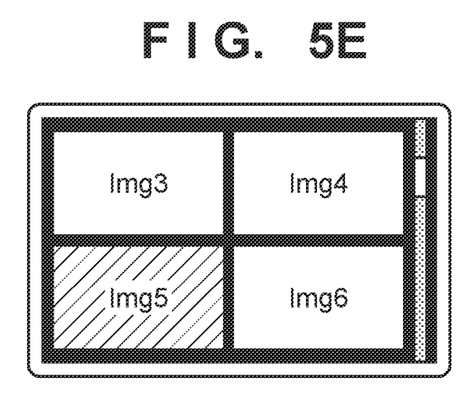
Figure 5F:
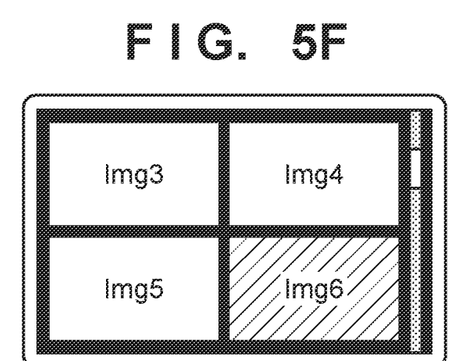

When the switching operation is performed in a direction in which no image is displayed in the display unit 116, the images used in the four-split display are changed. For example, when the down button of the multi-controller is pressed in the state of FIG. 5C, the displayed images are changed as illustrated in FIG. 5E, and the selected image is switched. When the right button of the multi-controller is pressed in the state of FIG. 5D, the displayed images are changed as illustrated in FIG. 5E, and the selected image is switched. When the down button of the multi-controller is pressed in the state of FIG. 5D, the displayed images are changed as illustrated in FIG. 5F, and the selected image is switched. While FIGS. 5A to 5F illustrate a four-split display, the selected image is changed through the same process also in a nine-split display.

Figure 6:
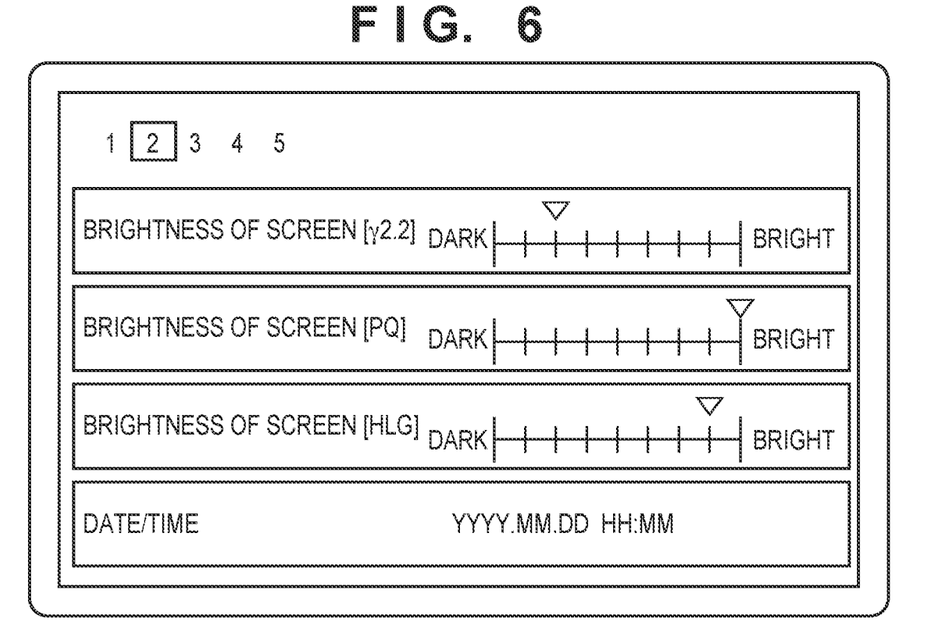
FIG. 6 is a diagram illustrating a display for setting a brightness of a screen for each EOTF.

FIG. 6 illustrates a display for setting a brightness of a screen for each EOTF. The EOTF for which to change the screen brightness setting is selected using the up and down buttons of the multi-controller of the operation unit 104, and the screen brightness is set using the left and right buttons of the multi-controller of the operation unit 104.

Figure 7:
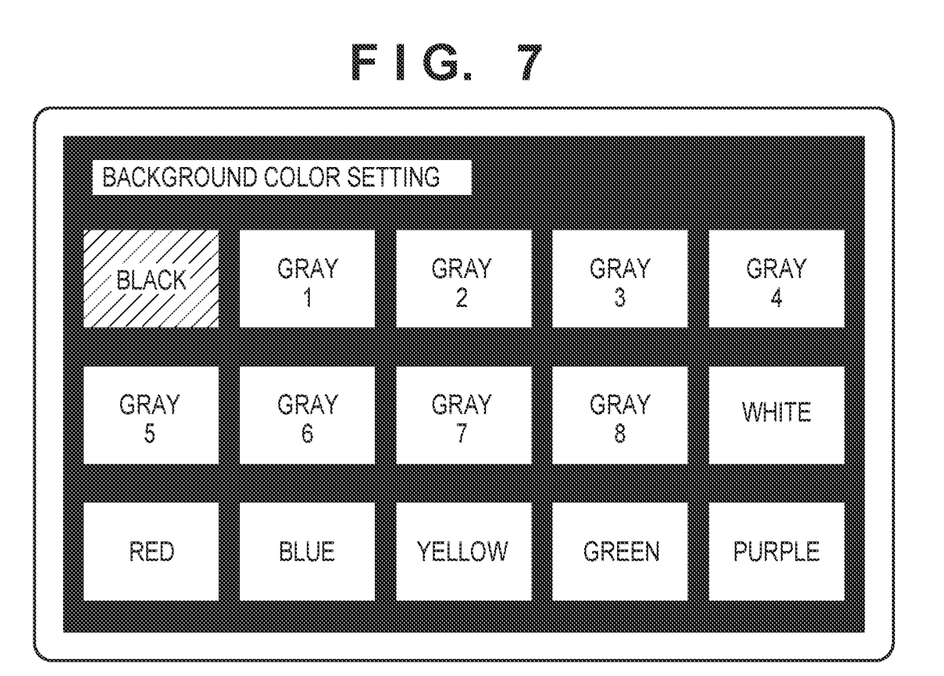
FIG. 7 is a diagram illustrating a display for setting a background color.

FIG. 7 is a diagram illustrating a display for setting the background color. The diagonal hatching indicates the selection state. The setting is performed through a touch operation and/or the up and down buttons of the multi-controller of the operation unit 104. The background color is corrected on the basis of this setting.

Flow of Entire Processes of Digital Camera 100

Figure 8:
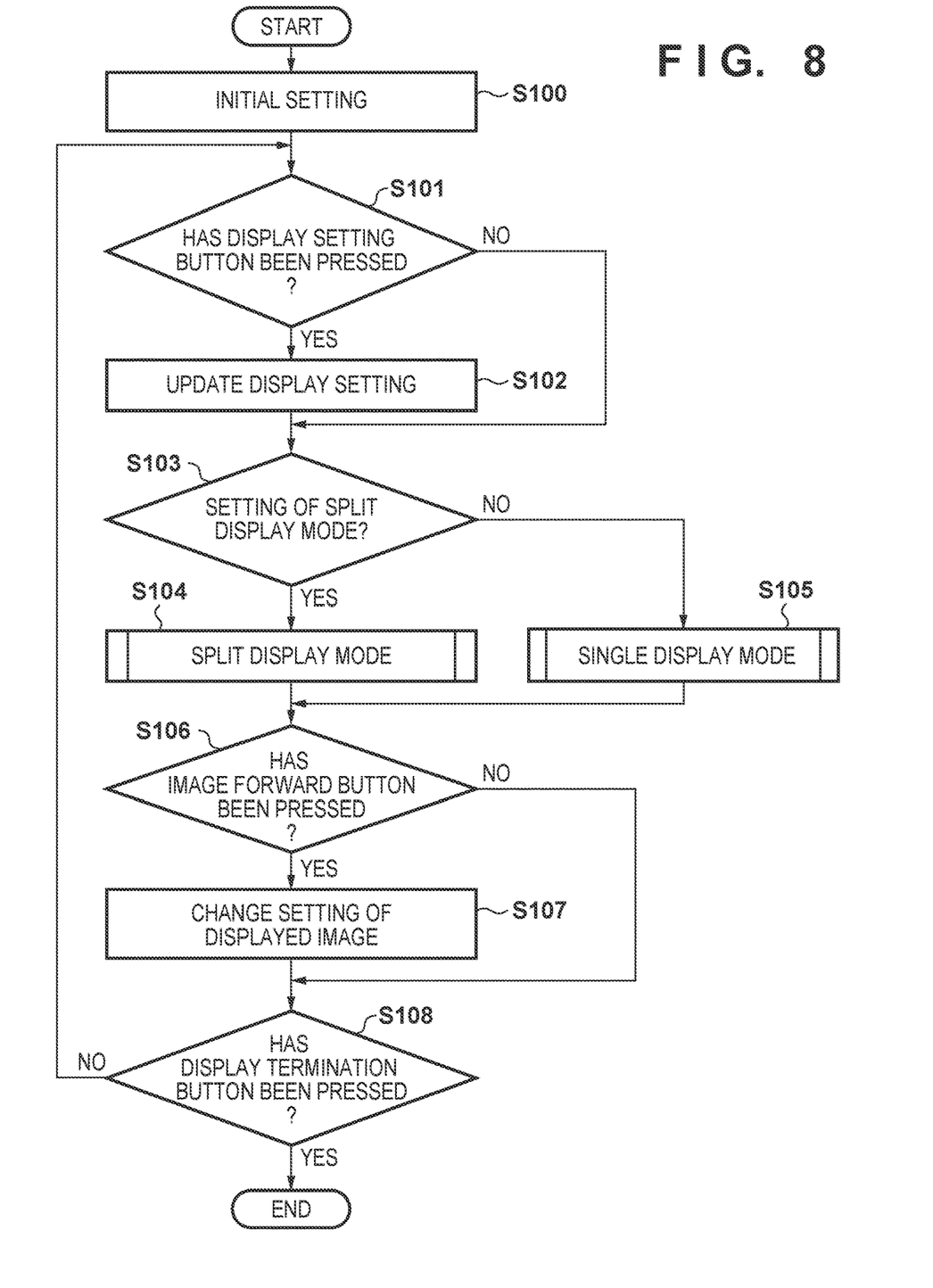
FIG. 8 is a flowchart illustrating a flow of an image display operation.

FIG. 8 is a flowchart illustrating a flow of an image display operation in the digital camera 100. When the display mode is selected by means of the mode switching button of the operation unit 104, the process of FIG. 8 is started.

At S100, the CPU 101 reads the initial setting value from the non-volatile memory 103, and initializes the display unit 116 by means of the display control unit 115. The initial setting value is the image initially displayed, the luminescence intensity, and the like. The CPU 101 proceeds with the process of the flowchart from S100 to S101.

At S101, the CPU 101 determines whether the display setting button has been pressed. When it is determined at S101 that the display setting button has been pressed, the CPU 101 proceeds with the process of the flowchart from S101 to S102. When it is determined at S101 that the display setting button has not been pressed, the CPU 101 proceeds with the process of the flowchart from S101 to S103.

At S102, the CPU 101 reads display setting screen data from the non-volatile memory 103, stores it in the memory 102, and displays the display setting screen on the display unit 116. The CPU 101 changes the setting of the display in accordance with the input from the operation unit 104. The display setting items are whether a single image is displayed or a plurality of images are displayed split in the display unit 116, the background color, the luminescence intensity of each EOTF, and the like. The CPU 101 proceeds with the process of the flowchart from S102 to S103.

At S103, the CPU 101 determines whether it is the setting of a split display mode. When it is determined at S103 that the display mode is the setting of the split display mode, the CPU 101 proceeds with the process of the flowchart from S103 to S104. When it is determined at S103 that the display mode is not the setting of the split display mode, the CPU 101 proceeds with the process of the flowchart from S103 to S105.

At S104, the CPU 101 displays the image in a split display mode. Details of the split display mode are described later with reference to FIG. 9. The CPU 101 proceeds with the process of the flowchart from S104 to S106.

At S105, the CPU 101 displays the image in a single display mode. Details of the single display mode are described later with reference to FIG. 11. The CPU 101 proceeds with the process of the flowchart from S105 to S106.

At S106, the CPU 101 determines whether an image forward button has been pressed. When it is determined at S106 that the image forward button has been pressed, the CPU 101 proceeds with the process of the flowchart from S106 to S107. When it is determined at S106 that the image forward button has not been pressed, the CPU 101 proceeds with the process of the flowchart from S106 to S108.

At S107, the CPU 101 changes the setting of the displayed image in accordance with the number of times the image forward button has been pressed, and the like. The CPU 101 proceeds with the process of the flowchart from S107 to S108.

At S108, the CPU 101 determines whether the display termination button has been pressed. When it is determined at S108 that the display termination button has been pressed, the CPU 101 terminates the process of the flowchart. When it is determined at S108 that the display termination button has not been pressed, the CPU 101 returns to the process of the flowchart from S108 to S101.

Figure 9:
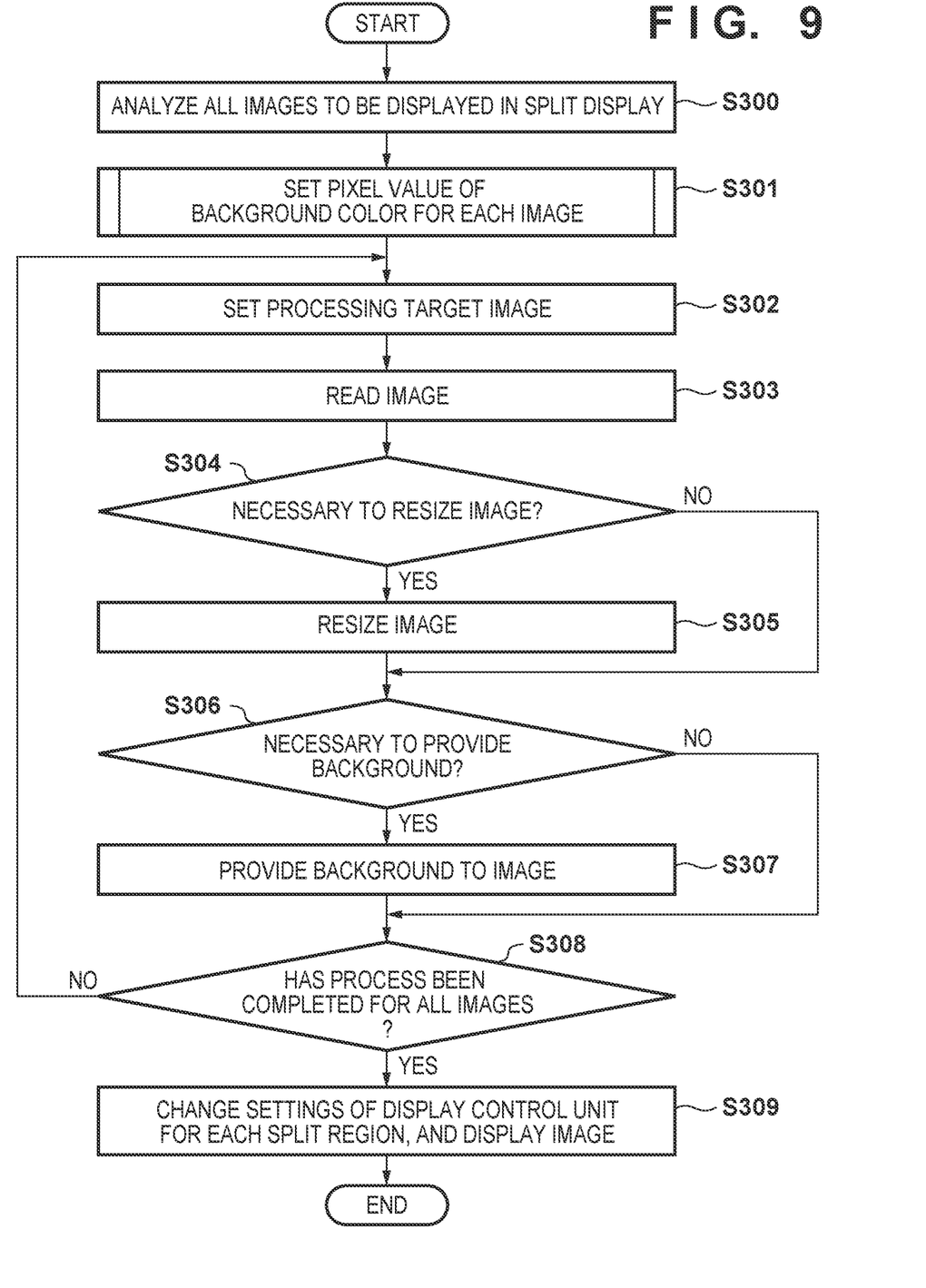
FIG. 9 is a flowchart illustrating an exemplary process of a split display mode.

FIG. 9 is a flowchart illustrating an exemplary process of the split display mode.

At S300, the CPU 101 analyzes all the images to be displayed in the split display. Through analysis of the image file, information such as the image size, color gamut, EOTF, and the like of each image is acquired. In the case where the digital camera 100 stores the image information in another file, such a file may be referred to. The CPU 101 sets the split regions for displaying the images, i.e., a correspondence relationship between the split regions and the images. The CPU 101 proceeds with the process of the flowchart from S300 to S301.

At S301, the CPU 101 sets the pixel value of the background color for each image. Details of the process of setting the pixel value of the background color for each image are described later with reference to FIG. 10. The CPU 101 proceeds with the process of the flowchart from S301 to S302.

At S302, the CPU 101 sets the processing target image. The CPU 101 proceeds with the process of the flowchart from S302 to S303.

At S303, the CPU 101 reads the processing target image from the recording medium 120 and writes it in the memory 102. The CPU 101 proceeds with the process of the flowchart from S303 to S304.

At S304, the CPU 101 determines whether resizing of the image is necessary from the image size of the processing target image. When it is determined at S304 that the resizing of the image is necessary, the CPU 101 proceeds with the process of the flowchart from S304 to S305. When it is determined at S304 that the resizing of the image is not necessary, the CPU 101 proceeds with the process of the flowchart from S304 to S306.

At S305, the image processing unit 113 resizes the processing target image. Any method may be used for the resizing process. The CPU 101 proceeds with the process of the flowchart from S305 to S306.

At S306, the CPU 101 determines whether it is necessary to provide a background. In the case where the aspect ratio of the processing target image resized at S305 and the aspect ratio of the split display region are identical to each other, provision of the background may not be necessary, and therefore whether provision of the background is necessary is determined.

When it is determined at S306 that provision of the background is necessary, the CPU 101 proceeds with the process of the flowchart from S306 to S307. When it is determined at S306 that provision of the background is not necessary, the CPU 101 proceeds with the process of the flowchart from S306 to S308.

At S307, the image processing unit 113 provides a background to the processing target image. The CPU 101 proceeds with the process of the flowchart from S307 to S308.

At S308, the CPU 101 determines whether the process has been completed for all the images. When it is determined at S308 that the process has been completed for all the images, the CPU 101 proceeds with the process of the flowchart from S308 to S309. When it is determined at S308 that the process has not been completed for all the images, the CPU 101 returns to the process of flowchart from S308 to S302.

At S309, in accordance with information such as the color gamut, EOTF, and the like of the images and the correspondence relationship between the split regions and the images set at S300, the display control unit 115 sets the color gamut, EOTF, and the like for each split region, and displays the image, and then, terminates the process.

Figure 10:
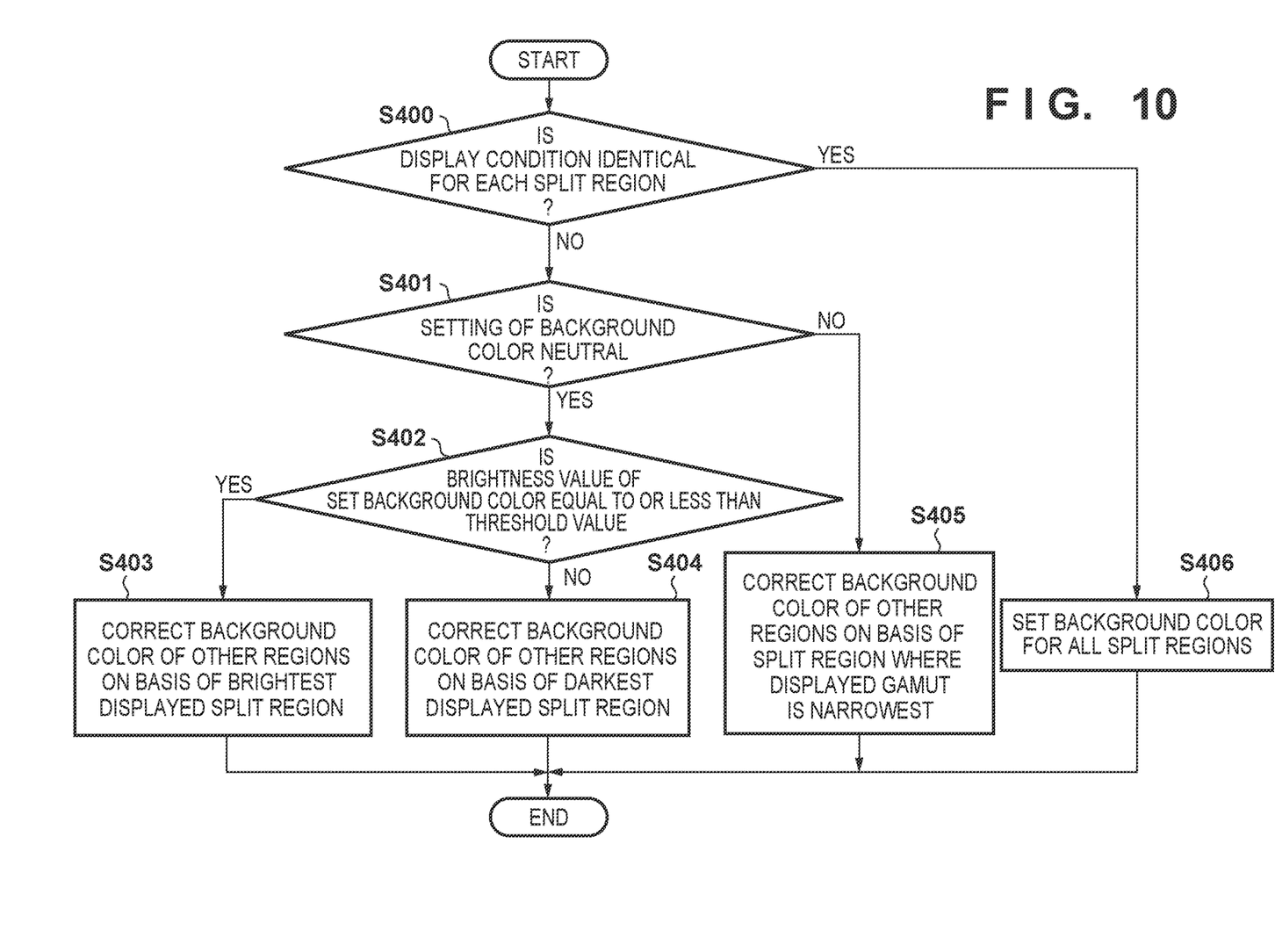
FIG. 10 is a flowchart illustrating an exemplary process of setting a pixel value of a background color for each image.

FIG. 10 is a flowchart illustrating an exemplary process of setting a pixel value of a background color for each image.

At S400, the CPU 101 determines whether the display condition is identical for all the split regions. When it is determined at S400 that the display condition is identical for all the split regions, the CPU 101 proceeds with the process of the flowchart from S400 to S406. When it is determined at S400 that the display condition is not identical for all the split regions, the CPU 101 proceeds with the process of the flowchart from S400 to S401.

At S401, the CPU 101 determines whether the background color is neutral or chromatic. When it is determined at S401 that the background color is neutral, the CPU 101 proceeds with the process of the flowchart from S401 to S402. When it is determined at S401 that the background color is not neutral, the CPU 101 proceeds with the process of the flowchart from S401 to S405.

At S402, the CPU 101 determines whether the brightness value of the set background color is not greater than a threshold value. When it is determined at S402 that the brightness value of the set background color is not greater than the threshold value, the CPU 101 proceeds with the process of the flowchart from S402 to S403. When it is determined at S402 that the brightness value of the set background color is greater than the threshold value, the CPU 101 proceeds with the process of the flowchart from S402 to S404. The threshold value in the process of S402 may be changed in accordance with the bit depth such that 2N-1 is set when the bit depth of the image is N bits.

At S403, the CPU 101 calculates which split region has the highest background color brightness when the pixel value of the same background color set in the background color setting in FIG. 7 is displayed for each split region. Then, with respect to the brightness value of the background color of the split region where the brightness of the background color is highest as a reference value, correction values (pixel values) of the background colors for the split regions are calculated such that the background colors of the other split regions have the same appearance (the background colors are visually recognized to be the same among the images), and then the process is terminated.

At S403, for example, in the case where the setting value of the background color is black, (R, G, B)=(0, 0, 0), no further reduction in brightness of the displayed background color by the correction is allowed in the split region where the display of that black background color is brightest. By performing the correction such that the background colors of the other split regions are slightly brightened, the backgrounds can be set to the same appearance. Therefore, the background colors of the other split regions are corrected on the basis of the split region where the displayed background color is brightest.

At S404, the CPU 101 calculates which split region has the smallest background color brightness when the pixel value of the background color set in the background color setting in FIG. 7 is displayed for each split region. Then, with respect to the brightness value of the background color of the split region where the brightness of the background color is smallest as a reference value, correction values of the background colors for the split regions are calculated such that the background colors of the other split regions have the same appearance, and then the process is terminated.

At S404, for example, in the case where the setting value of the background color is white, (R, G, B)=($2^{N-1}$-1, $2^{N-1}$-1, $2^{N-1}$-1), no further increase in brightness of the displayed background color by the correction is allowed in the split region where the display of that white background color is darkest. By performing the correction such that the background colors of the other split regions are slightly darkened, the backgrounds can be set to the same appearance. Therefore, the background colors of the other split regions are corrected on the basis of the split region where the displayed background color is darkest.

While the cases where the background color is black and white are described above, the following processes are performed in the case where the set background color is gray. Specifically, in the case where it is determined at S402 that the luminance value of the gray background color is equal to or less than the threshold value, the correction value of the background color is calculated at S403 such that the background colors of the other split regions are set to the same appearance with respect to the brightness value of the background color of the split region where the brightness of the background color is highest. In addition, in the case where it is determined at S402 that the brightness value of the gray background color is greater than the threshold value, the correction value of the background color is calculated at S403 such that the background colors of the other split regions are set to the same appearance with respect to the brightness value of the background color of the split region where the brightness of the background color is smallest.

At S405, the CPU 101 calculates which split region has the narrowest background color gamut when the pixel value of the background color set in the background color setting in FIG. 7 is displayed for each split region. Then, the correction value of the background color of each split region is calculated such that the background colors of the other split regions are set to the same appearance with respect to the color gamut of the background color of the split region where the color gamut of the background color is narrowest, and then the process is terminated.

At S405, for example, in the case where the setting value of the background color is red, (R, G, B)=($2^{N-1}$–1, 0, 0), the color gamut of the displayed background color cannot be widened by the correction in the split region where the display of that red background color is narrowest. By performing the correction such that the color gamut of the background colors of the other split regions is slightly narrowed, the backgrounds can be set to the same appearance. Therefore, the background colors of the other split regions are corrected on the basis of the split region where the color gamut of the displayed background color is narrowest.

At S406, since the display condition is identical for all the split regions, the correction of the background color is not necessary, and therefore the CPU 101 sets the pixel value of the background color set in the background color setting in FIGS. 7 and 8 to all split regions, and then terminates the process.

Figure 11:
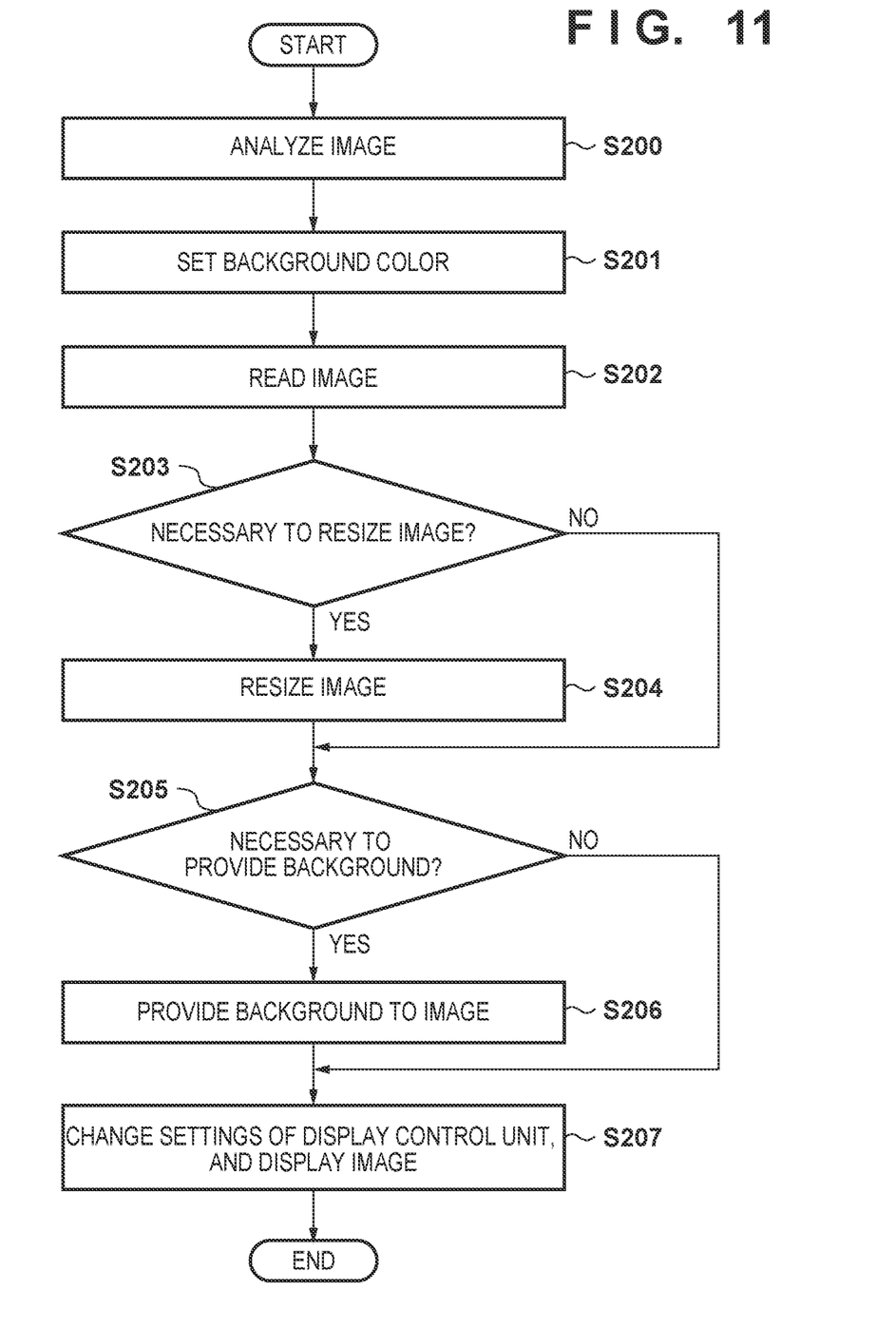
FIG. 11 is a flowchart illustrating an exemplary process of a single display mode.

FIG. 11 is a flowchart illustrating an exemplary process in the single display mode.

At S200, the CPU 101 analyzes the displayed image. Information such as the image size, color gamut, EOTF, and the like of the displayed image is acquired by analyzing the image. The CPU 101 proceeds with the process of the flowchart from S200 to S201.

At S201, the CPU 101 sets the pixel value of the background color. The CPU 101 proceeds with the process of the flowchart from S201 to S202.

At S202, the CPU 101 reads the processing target image from the recording medium 120 and writes it in the memory 102. The CPU 101 proceeds with the process of the flowchart from S202 to S203.

At S203, the CPU 101 determines whether resizing of the image is necessary from the image size of the processing target image. When it is determined at S203 that the resizing of the image is necessary, the CPU 101 proceeds with the process of the flowchart from S203 to S204. When it is determined at S203 that the resizing of the image is not necessary, the CPU 101 proceeds with the process of the flowchart from S203 to S205.

At S204, the image processing unit 113 resizes the processing target image. The CPU 101 proceeds with the process of the flowchart from S204 to S205.

At S205, the CPU 101 determines whether it is necessary to provide a background. In the case where the aspect ratio of the processing target image resized at S204 and the aspect ratio of the split display region are identical to each other, provision of the background may not be necessary, and therefore whether provision of the background is necessary is determined.

When it is determined at S205 that provision of the background is necessary, the CPU 101 proceeds with the process of the flowchart from S205 to S206. When it is determined at S205 that provision of the background is not necessary, the CPU 101 proceeds with the process of the flowchart from S205 to S207.

At S206, the image processing unit 113 provides the background to the processing target image. The CPU 101 proceeds with the process of the flowchart from S206 to S207.

At S207, the display control unit 115 sets the color gamut, EOTF, and the like on the basis of information such as the color gamut and EOTF of the image analyzed at S200, and displays the image, and then, terminates the process.

While an exemplary case where the correction for the background color is computed through calculation is illustrated in the present embodiment, calculation results may be stored as a table in the non-volatile memory 103.

In addition, while the background color is not corrected in the single display in FIG. 11, the background color may be corrected in the case where it is preferable that the background color have the same appearance when the image of the single display is switched and compared. In this case, the background color is corrected by analyzing all the images recorded in the recording medium 120, and performing the processes as in the split display.

In addition, in the case where the display control unit 115 is capable of controlling (setting) a video range (full range) and a limited range, the background color may be corrected in consideration of the video range and the limited range.

In addition, while the correction of the background color is described in the present embodiment, similar problems occur also in On Screen Display (OSD), and therefore the process described in the present embodiment may be applied to OSD.

In addition, the display unit 116 may not be a liquid crystal display, an organic EL, or the like as long as the display unit 116 is a display device capable of splitting one screen into a plurality of regions and controlling and displaying the color gamut, display luminance and EOTF (Electro Optical Transfer Function) for each split region.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004619, filed Jan. 15, 2019, which is hereby incorporated by reference herein in its entirety.

What is claimed is:

1. A display apparatus comprising:
a display device capable of displaying a plurality of images in a respective plurality of regions and capable of changing at least one of a plurality of parameters including a luminance intensity, a color gamut, and an electro optical transfer function (EOTF) for each of the plurality of regions; and
at least one processor or circuit configured to function as a display control unit configured to control, when the display device is caused to display the plurality of images in the respective plurality of regions, the display device to display the plurality of images and a plurality of background images each of which is displayed around a respective one of the plurality of images such that an appearance of the plurality of background images is visually the same between the plurality of regions,
wherein the display control unit corrects pixel values of the background images respectively corresponding to at least two of the plurality of regions, whereby different pixel values are assigned to the background images respectively corresponding to at least two of the plurality of regions so that the appearance of the plurality of background images is visually the same between the plurality of regions,
wherein the display control unit displays the plurality of images side-by-side on a single screen of the display device, and
wherein in a case where a background image of the plurality of background images is black and a plurality of different regions in a single screen are different in the at least one of the plurality of parameters, the display control unit performs a correction such that, with respect to a region that has a highest display luminance when an identical black pixel value is input to the plurality of different regions as a reference region, a background image of regions other than the reference region is visually identical to the reference region.

2. The display apparatus according to claim 1, wherein the display device is capable of setting a full range or a limited range as a display range, and
wherein the display control unit sets a pixel value corresponding to the display range as a pixel value of a background color.

3. A display apparatus comprising:
a display device capable of displaying a plurality of images in a respective plurality of regions and capable of changing at least one of a plurality of parameters including a luminance intensity, a color gamut, and an electro optical transfer function (EOTF) for each of the plurality of regions; and
at least one processor or circuit configured to function as a display control unit configured to control, when the display device is caused to display the plurality of images in the respective plurality of regions, the display device to display the plurality of images and a plurality of background images each of which is displayed around a respective one of the plurality of images such that an appearance of the plurality of background images is visually the same between the plurality of regions,
wherein the display control unit corrects pixel values of the background images respectively corresponding to at least two of the plurality of regions, whereby different pixel values are assigned to the background images respectively corresponding to at least two of the plurality of regions so that the appearance of the plurality of background images is visually the same between the plurality of regions,
wherein the display control unit displays the plurality of images side-by-side on a single screen of the display device, and
wherein in a case where a background image of the plurality of background images is white and a plurality of different regions in a single screen are different in the at least one of the plurality of parameters, the display control unit performs a correction such that, with respect to a region that has a lowest display luminance when an identical white pixel value is input to the plurality of different regions as a reference region, a background image of regions other than the reference region is visually identical to the reference region.

4. The display apparatus according to claim 3, wherein the display device is capable of setting a full range or a limited range as a display range, and
wherein the display control unit sets a pixel value corresponding to the display range as a pixel value of a background color.

5. A method of controlling a display apparatus including a display device capable of displaying a plurality of images in a respective plurality of regions and capable of changing at least one of a plurality of parameters including a luminance intensity, a color gamut, and an electro optical transfer function (EOTF) for each of the plurality of regions, the method comprising:
controlling, when the display device is caused to display the plurality of images in the respective plurality of regions, the display device to display the plurality of images and a plurality of background images each of which is displayed around a respective one of the plurality of images such that an appearance of the plurality of background images is visually the same between the plurality of regions,
wherein in the controlling, pixel values of the background images respectively corresponding to at least two of the plurality of regions are corrected, whereby different pixel values are assigned to the background images respectively corresponding to at least two of the plurality of regions so that the appearance of the plurality of background images is visually the same between the plurality of regions,
wherein in the controlling, the plurality of images are displayed side-by-side on a single screen of the display device, and
wherein in a case where a background image of the plurality of background images is black and a plurality of different regions in a single screen are different in the at least one of the plurality of parameters, in the controlling, a correction is performed such that, with respect to a region that has a highest display luminance when an identical black pixel value is input to the plurality of different regions as a reference region, a background image of regions other than the reference region is visually identical to the reference region.

6. A non-transitory computer-readable storage medium storing a program for causing a computer to function as a unit of a display apparatus, the display apparatus comprising:

a display device capable of displaying a plurality of images in a respective plurality of regions and capable of changing at least one of a plurality of parameters including a luminance intensity, a color gamut, and an electro optical transfer function (EOTF) for each of the plurality of regions; and a display control unit configured to control, when the display device is caused to display the plurality of images in the respective plurality of regions, the display device to display the plurality of images and a plurality of background images each of which is displayed around a respective one of the plurality of images such that an appearance of the plurality of background images is visually the same between the plurality of regions, wherein in the control by the display control unit, pixel values of the background images respectively corresponding to at least two of the plurality of regions are corrected, whereby different pixel values are assigned to the background images respectively corresponding to at least two of the plurality of regions so that the appearance of the plurality of background images is visually the same between the plurality of regions, wherein in the controlling, the plurality of images are displayed side-by-side on a single screen of the display device, and wherein in a case where a background image of the plurality of background images is black and a plurality of different regions in a single screen are different in the at least one of the plurality of parameters, in the controlling, a correction is performed such that, with respect to a region that has a highest display luminance when an identical black pixel value is input to the plurality of different regions as a reference region, a background image of regions other than the reference region is visually identical to the reference region.

* * * * *